(12) United States Patent
Rodrigues et al.

(10) Patent No.: US 10,808,770 B2
(45) Date of Patent: Oct. 20, 2020

(54) SYSTEM FOR THE ROTATIONAL DECOUPLING OF SHAFTS

(71) Applicant: SAFRAN ELECTRICAL & POWER, Blagnac (FR)

(72) Inventors: Fernand Rodrigues, Blagnac (FR); Yves Courtois De Lourmel, Blagnac (FR)

(73) Assignee: SAFRAN ELECTRICAL & POWER, Blagnac (FR)

( * ) Notice: Subject to any disclaimer, the term of this patent is extended or adjusted under 35 U.S.C. 154(b) by 88 days.

(21) Appl. No.: 16/331,260

(22) PCT Filed: Sep. 13, 2017

(86) PCT No.: PCT/FR2017/052440
§ 371 (c)(1),
(2) Date: Mar. 7, 2019

(87) PCT Pub. No.: WO2018/051016
PCT Pub. Date: Mar. 22, 2018

(65) Prior Publication Data
US 2019/0219107 A1   Jul. 18, 2019

(30) Foreign Application Priority Data

Sep. 15, 2016 (FR) .................................... 16 58641

(51) Int. Cl.
*F16D 23/12* (2006.01)
*F02C 7/32* (2006.01)
(Continued)

(52) U.S. Cl.
CPC .............. *F16D 23/12* (2013.01); *F01D 15/10* (2013.01); *F02C 7/32* (2013.01); *F02C 7/36* (2013.01);
(Continued)

(58) Field of Classification Search
CPC .... F02C 7/32; F02C 7/36; F01D 15/10; F05D 2220/76–77; F05D 2260/40;
(Continued)

(56) References Cited

U.S. PATENT DOCUMENTS 2,894,775 A * 7/1959 Harless .................. F16D 11/14
192/69.9
3,563,353 A * 2/1971 LoPresti ................. F16D 11/10
192/21

(Continued)

FOREIGN PATENT DOCUMENTS

DE           822178 C    11/1951
DE    102016225096 A1 *  6/2018  .............. F16D 11/14

(Continued)

OTHER PUBLICATIONS

Search Report issued in French Patent Application No. 1658641 dated May 22, 2017.
(Continued)

*Primary Examiner* — Jacob S. Scott
(74) *Attorney, Agent, or Firm* — Pearne & Gordon LLP

(57) ABSTRACT

The invention relates to a system for the rotational decoupling of shafts, in particular drive shafts. The invention also relates to a generator protection system on a connection between a generator and a gas turbine engine. FIG. 1C illustrates the shaft-decoupling system in the decoupled position.

11 Claims, 4 Drawing Sheets

(51) Int. Cl.
    *F16D 11/14*     (2006.01)
    *F02C 7/36*     (2006.01)
    *F01D 15/10*     (2006.01)

(52) U.S. Cl.
    CPC .......... *F16D 11/14* (2013.01); *F05D 2220/76* (2013.01); *F05D 2260/40* (2013.01); *F05D 2260/403* (2013.01); *F16D 2023/123* (2013.01)

(58) Field of Classification Search
    CPC .... F05D 2260/403; F16D 11/08; F16D 11/14; F16D 2023/123; F16D 23/12; F16D 11/10
    See application file for complete search history.

(56) References Cited

U.S. PATENT DOCUMENTS

| | | |
|---|---|---|
| 4,167,695 A | 9/1979 | Phillips |
| 4,244,455 A | 1/1981 | Loker |
| 2012/0279334 A1 * | 11/2012 | Gaully .................... F16D 11/10 74/333 |
| 2018/0003385 A1 | 1/2018 | Rodrigues et al. |

FOREIGN PATENT DOCUMENTS

| | | | |
|---|---|---|---|
| EP | 2184503 A2 | 5/2010 | |
| WO | WO-2017125135 A1 * | 7/2017 | ............. F16D 67/02 |
| WO | WO-2018014950 A1 * | 1/2018 | ............. F16D 23/12 |

OTHER PUBLICATIONS

International Search Report issued in Application No. PCT/FR2017/052440 dated Jan. 12, 2018.
Written Opinion issued in Application No. PCT/FR2017/052440 dated Jan. 12, 2018.

* cited by examiner

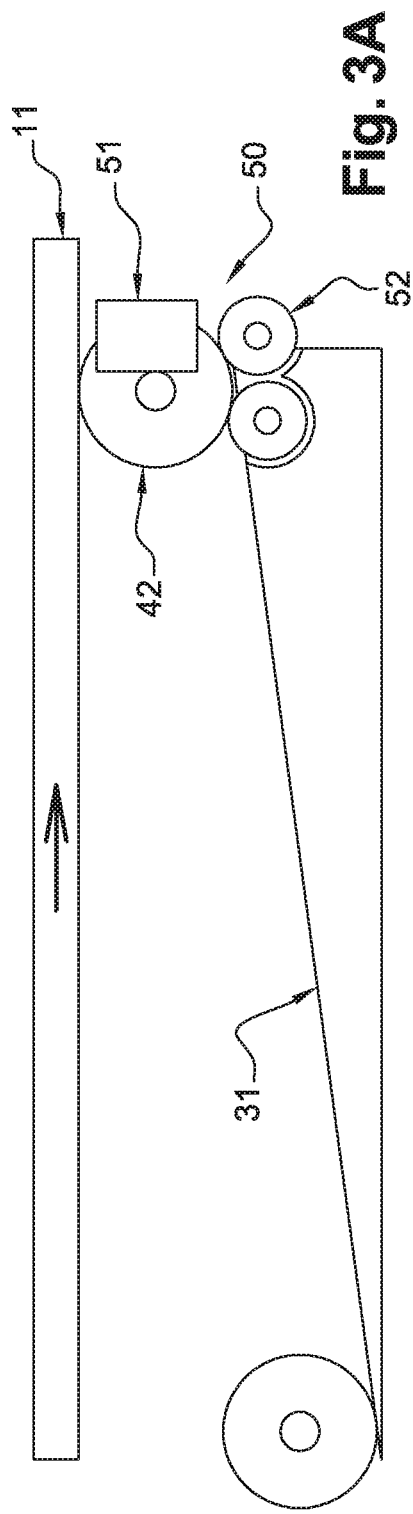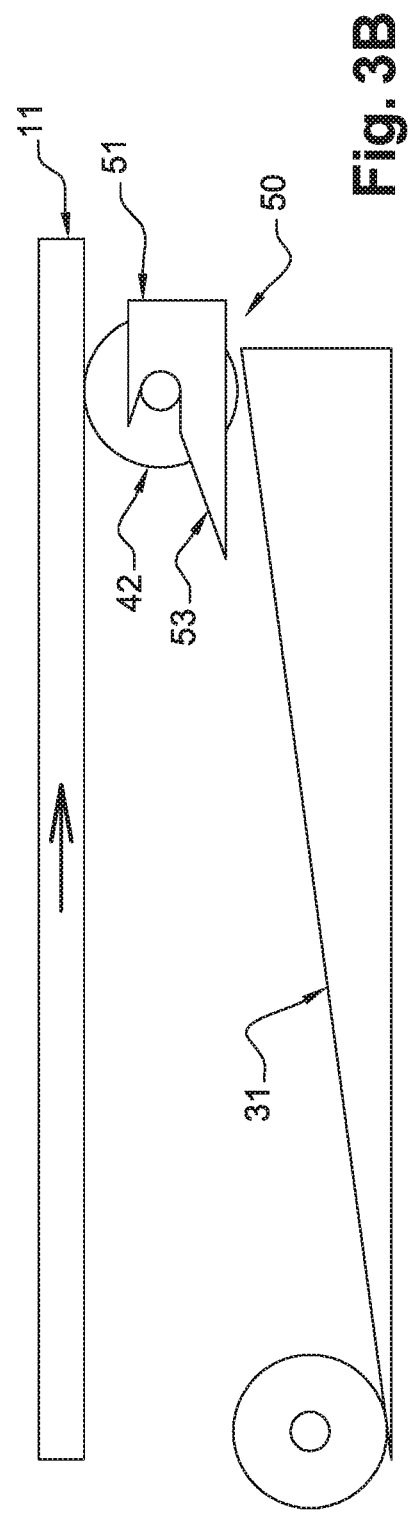

SYSTEM FOR THE ROTATIONAL DECOUPLING OF SHAFTS

This is the National Stage application of PCT international application PCT/FR2017/052440, filed on Sep. 13, 2017 entitled "SYSTEM FOR THE ROTATIONAL DECOUPLING OF SHAFTS", which claims the priority of French Patent Application No. 16 58641 filed Sep. 15, 2016, both of which are incorporated herein by reference in their entirety.

TECHNICAL FIELD

The invention relates to a system for rotational decoupling of shafts, in particular of shafts of a drive transmission. The invention also relates to a system for protection of a generator on a connection between a generator and a gas turbine engine.

PRIOR ART

The electric generators in aerospace applications are generally driven by a power gearbox which, itself, is driven by a gas turbine engine. In order to allow the generator to produce sufficient electric power when the gas turbine engine is in operation, the generator is subjected to a high speed.

From time to time, a fault can occur in the generator. Since the generator operates at high speeds, it is desirable to provide a possibility of disconnection or decoupling of the shafts participating in the driving of the generator when such a fault, or the development of a fault, is detected in the generator by its monitoring system in order to prevent or reduce further damage to the generator or of the associated components.

For example, if a fault in the supply of lubrication oil of the generator or a mechanical fault is detected, or even a problem related to an excessive temperature of pressure, or a level of oil below a certain threshold, a system for decoupling of shafts can be triggered in order to interrupt the driving of the generator in order to protect it. Given the high speed at which the generator is often driven, it is practically always necessary to provide an immediate disconnection of the generator from the gas turbine engine, since the fault can be amplified rapidly and possibly destroy the generator.

At present, there are systems for decoupling transmission shafts that are part of the system for generator protection over connections between a generator and a gas turbine engine. When an incident or a fault is detected in the generator by the monitoring system, the system for decoupling the shafts is triggered.

An example of such a decoupling system comprises an actuator linked to one of the shafts that can act to pull one of the shafts, or move apart the two shafts, in order to interrupt the driving. This decoupling system, although allowing rapid decoupling, is not ideal since it needs significant external energy to provide the force required to overcome the torque between the two shafts in order to carry out the decoupling. Not only is a significant force required, but in addition, this decoupling system requires components capable of providing such a force that are often bulky and heavy.

The patent application EP2184503 A2 shows another example of a system for decoupling of shafts, which is part of a system for protection of a generator. This system is generally preferred since it uses the energy of rotation of the shafts to separate them. It comprises an extensible piston adjacent and parallel to a shaft of a generator and driven by the latter. The extensible piston comprises an axially movable portion with an upwards spiral on its outside. When the decoupling system is triggered, a rod allows the engagement of the spiral on the movable portion of the extensible piston and makes it rise, due to the fact that the extensible piston is in rotation, until it is pushed against a flange secured onto the shaft of the generator. This has the effect of decoupling the shaft of the generator from the shaft of the gas turbine engine.

This system also is not highly adapted to disconnecting the generator from the gas turbine engine. The overall structure of this system, in particular the fact that the force for separating the shafts is transmitted entirely via the spiral and the rod does not contribute to a solid structure. Moreover, at the high speed or at the maximum torque, this may involve a problem of unreliability of the disconnection, for example slippage between the rod and the spiral. Thus, it appears that the force is applied to the flange in an asymmetric manner with respect to the shaft of the generator, which can have a negative effect.

DISCLOSURE OF THE INVENTION

The object of the present invention is therefore to overcome the aforementioned disadvantages by proposing a system for rotational decoupling of shafts comprising:
 a first shaft,
 second shaft,
the first shaft extending along a first axis and being mounted rotatably about this axis, the first shaft being capable of axially sliding along the first axis from a position of connection with transmission of rotation to the second shaft to a position of decoupling from the second shaft, and vice versa,
characterised in that the system further comprises:
 a flange located on the first shaft,
 a fixed structure located substantially around the first axis and facing the flange, the fixed structure comprising ramps ascending in the axial direction towards the flange,
 a roller ring located around the first axis and axially between the flange and the fixed structure, the roller ring being movable in rotation and comprising rollers, the rollers being interposed between the ramps and the flange, the roller ring being configured to be rotated in such a way that the rollers move, between the flange and the ramps, in the direction of rotation of the flange on the ramps and in such a way as to axially move apart the flange and the fixed structure, such that the first shaft slides from a position of connection to the second shaft to a decoupling position.

Preferably, the flange extends radially from the first shaft with respect to the first axis, and the axes of rolling of rollers are substantially perpendicular to the first axis.

Preferably, the fixed structure is a fixed ring with two circumferential ramps located on its diametrically opposed sides, and the roller ring comprises two rollers located on its diametrically opposed sides.

Preferably, the system comprises a biasing means for biasing the roller ring into rotation.

Advantageously, the biasing means is a spring or an actuator.

Preferably, the system comprises a trapping member for maintaining the position of the roller ring when these rollers have moved to the top of the ramps.

Advantageously, the trapping member comprises a stop.

Advantageously, the trapping member comprises small wheels or an inclined part.

Advantageously, the roller ring is rotatably mounted in a roller support, and the trapping member comprises a pin biased by a spring.

Preferably, the first shaft is a driven shaft and the second shaft is a drive shaft.

The present invention also proposes a system for protection of a generator on a connection between a gas turbine engine and a generator comprising:
 a monitoring system,
 a system for rotational decoupling of shafts as that defined above, wherein the first shaft is a shaft of a generator and the second shaft is a shaft connected to a gas turbine engine.

BRIEF DESCRIPTION OF THE DRAWINGS

An embodiment of the invention is described below, as a non-limiting example, in reference to the appended drawings, in which:

FIGS. 3A and 3B schematically illustrate means for maintaining the shafts in a decoupled position.

In all of these drawings, identical references can designate identical or similar elements. Moreover, the various portions shown in the drawings are not necessarily shown to the same scale, in order to make the drawings more readable.

DETAILED DISCLOSURE OF A SPECIFIC EMBODIMENT

Figure 1A:
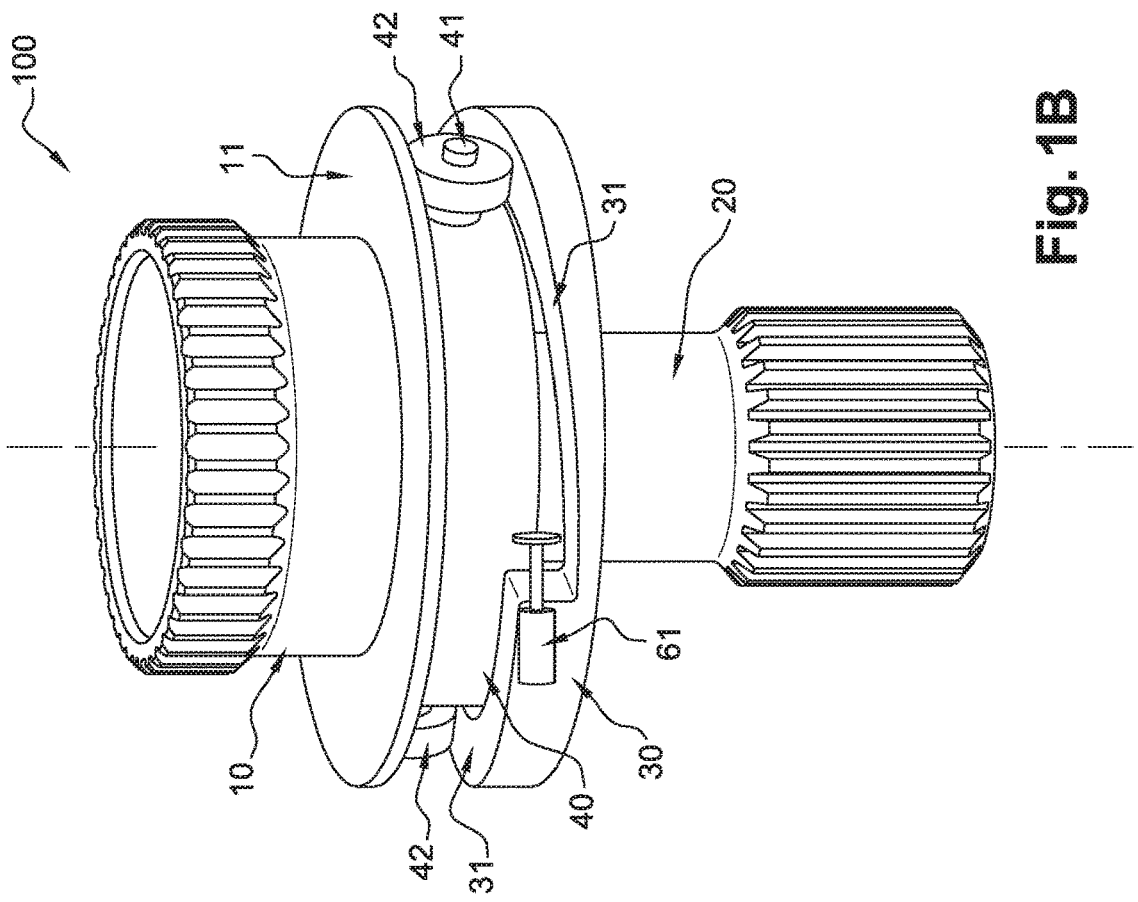
FIGS. 1A to 1C illustrate, in a simplified manner and in perspective, the kinematics of a system for rotational decoupling of shafts according to a first embodiment of the invention.
Figure 1B:
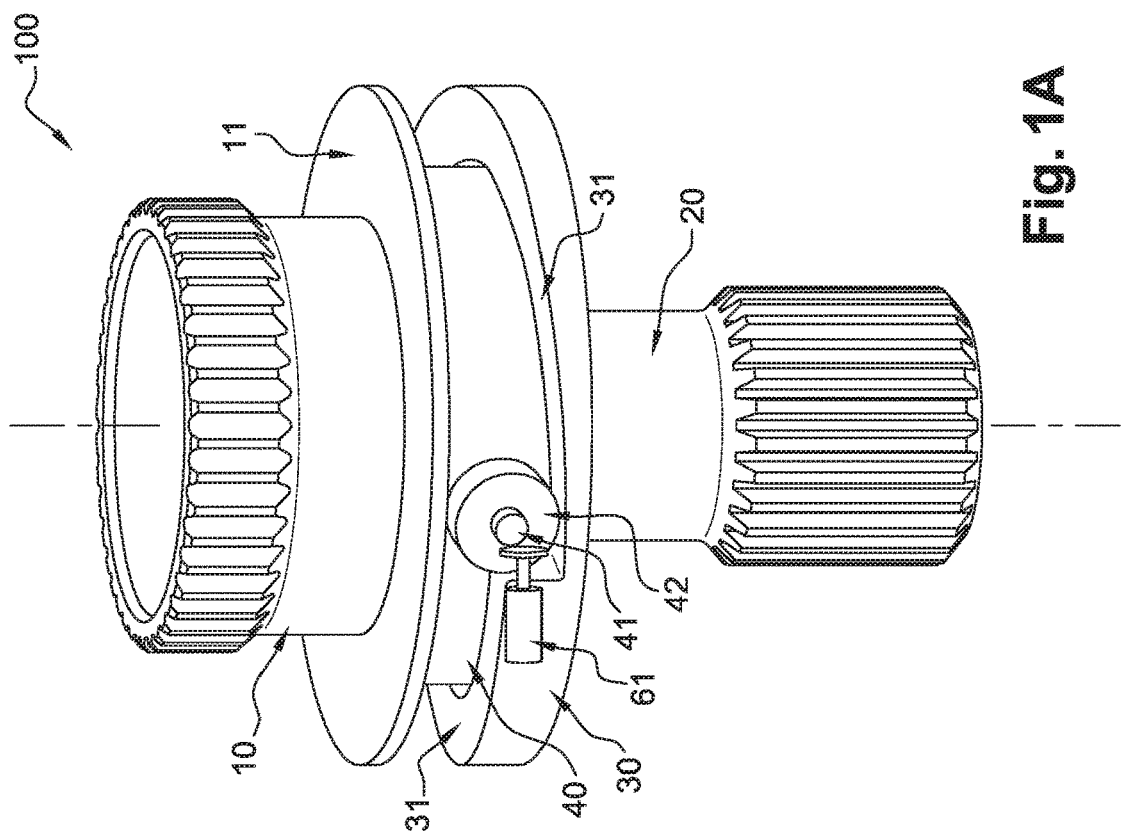
Figure 2A:
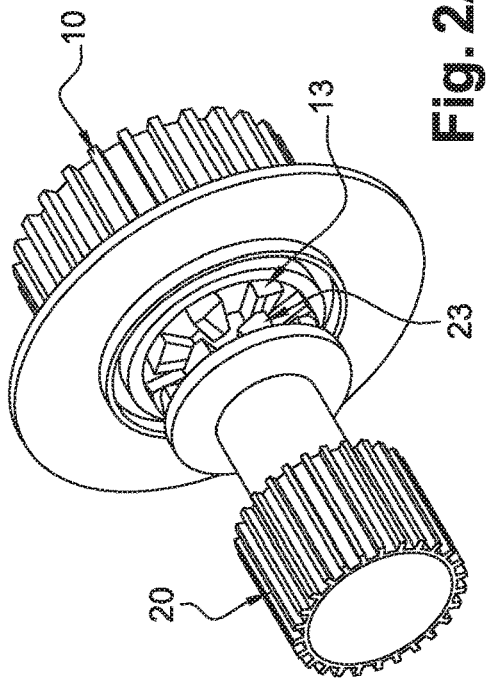
FIGS. 2A and 2B illustrate, in perspective, the shafts of FIGS. 1A to 1C, respectively showing the decoupled position and the rotationally connected position.
Figure 2B:
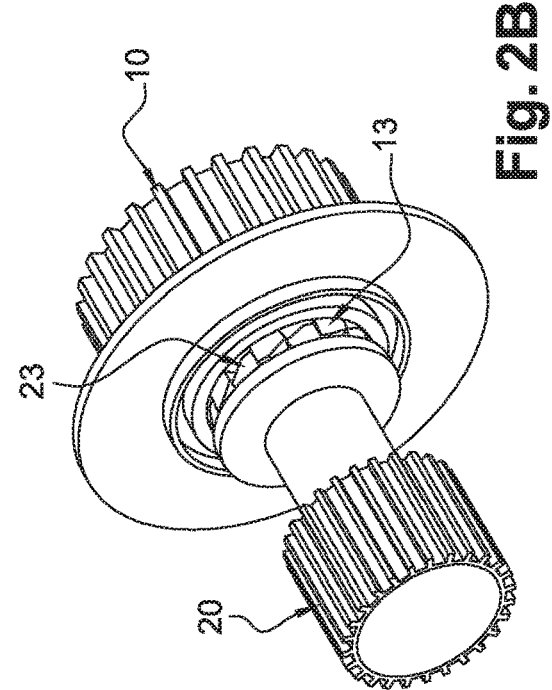
Figure 1C:
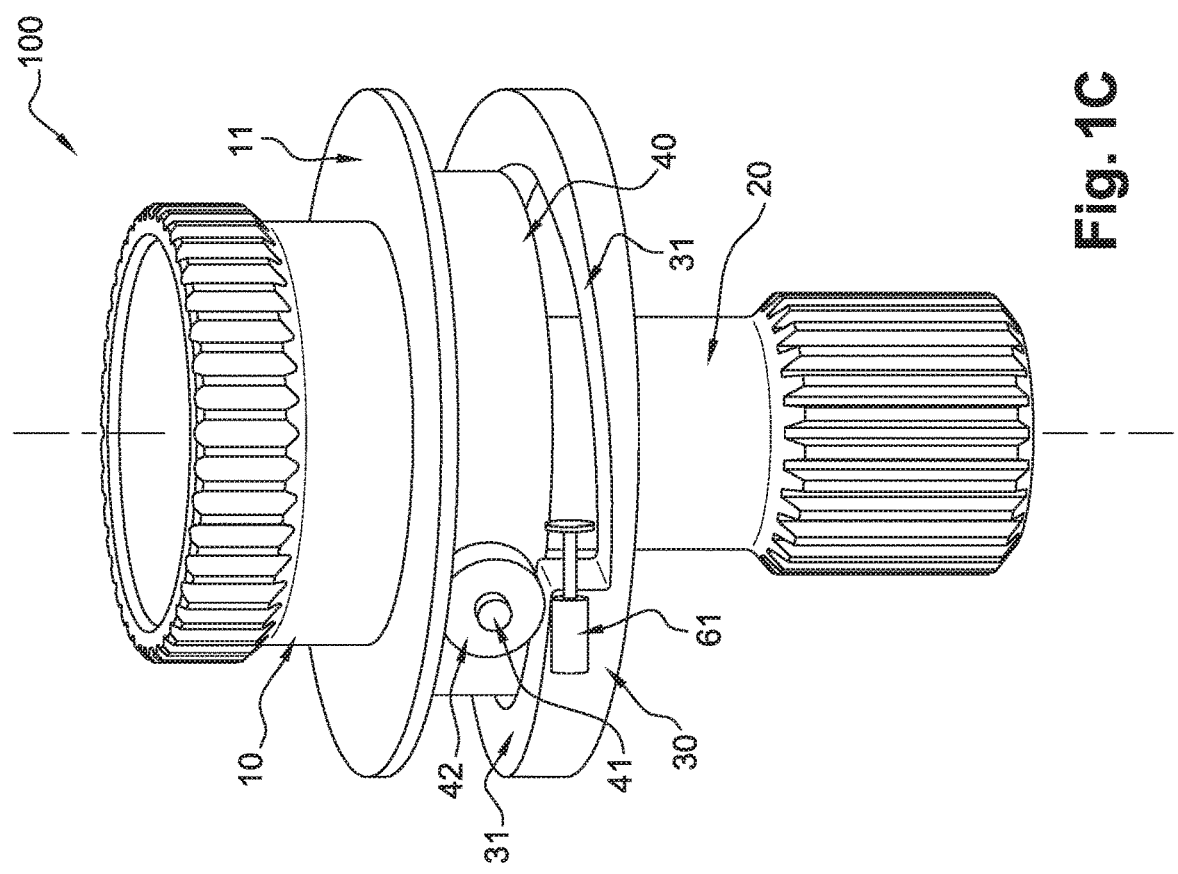

FIGS. 1A to 1C illustrate the kinematics of a system 100 for decoupling of shafts that is part of a system for protection of a generator on a connection between a generator and a gas turbine engine. FIGS. 2A and 2B illustrate shafts themselves in connected and a decoupled position, in order to make visible the gear teeth and the way in which the connection by gears is carried out.

First of all, the main portions of the system 100 for decoupling of shafts will be described by referring to FIG. 1A. FIG. 1A illustrates a shaft of the generator 10 (the first shaft) extending along a first axis and mounted rotatably about this axis. This shaft of the generator 10 is capable of axially sliding, along the first axis, in order to connect to a shaft of a gas turbine engine 20 (the second shaft) or to disconnect from the latter. Each shaft 10, 20 comprises gear teeth 13, 23, allowing a connection and a disconnection in the axial direction, in order to transmit the movement of rotation. A spring (not shown) axially pushes the shaft of the generator 10 towards the shaft of the gas turbine engine 20 in order to ensure the dog clutching between them.

Usually, the shaft of the gas turbine engine 20 is a drive shaft that transmits its movement of rotation to the shaft of the generator 10, which is thus driven in order to produce electricity, and in order to power electric and electronic equipment and components. Often, a gearbox is present between the gas turbine engine and the portion for generation of electricity of the generator in order to transmit the movement of rotation and modify the gear ratio.

However, for reasons of simplification, the connection will be supposed to be between a gas turbine engine and a generator, and it should be understood that the connection is not necessarily directly between a gas turbine engine and the portion for generation of electricity of a generator, but is between a shaft linked to the gas turbine engine and a generator, for example, made between a gearbox linked to the gas turbine engine, thus a shaft linked to the gas turbine engine, or between the gas turbine engine and a gearbox integrated into the generator. The two shafts 10, 20 are connected to each other by meshing and are thus connected in a state of transmission of rotation, for rotation about a first axis.

The shaft of the generator 10 comprises a flange 11 made of a single piece, extending radially from the shaft of the generator 10 and driven in rotation with the latter. The flange 11 is circular, and substantially flat, in particular its surface facing the shaft of the gas turbine engine 20.

A fixed structure 30 is provided substantially around the first axis, which is facing the flange 11. In this embodiment, this fixed structure 30 is in the form of a fixed ring, surrounding the connection between the two shafts 10, 20, and substantially corresponding to the diameter of the flange 11, and comprising ramps 31 that extend along the circumference of the fixed ring 30 and which are ascending in the direction of the flange 11. This fixed ring 30 can be part of the case of the generator, a wall of the gas turbine engine, or even a fixed independent structure.

Two circumferential ramps 31 are provided on the fixed ring 30 generally facing the flange 11, the ramps 31 being located at the diametrically opposed sides and each extending along half of the circumference of the fixed ring 30. From the bottom to the top, the ramps 31 have a substantially uniform slope. The height of the ramps 31 is substantially greater than the distance of engagement of the teeth 13, 23 via dog clutching on the shafts 10, 20, in order to allow the decoupling of the shafts.

Between the flange 11 and the fixed ring 30, a roller ring 40 is provided. It also extends around the first axis, substantially surrounding the connection between the two shafts 10, 20, and is movable in rotation and also in translation. It comprises two radial rods 41, with a roller 42 mounted on each rod 41. In this case, the rods 41 protrude towards the outside of the roller ring 40. They are located at the diametrically opposed sides of the roller ring 40. The rods 41, and thus the axes of rolling of the rollers 42, are effectively perpendicular to the first axis.

The rollers 42 are positioned between the ramps 31 and the flange 11 (in the axial direction). The relative rotation between the roller ring 40 and the fixed ring 30 has the consequence of raising the rollers 42 on the ramps 31, and moves apart the two rings 30, 40. Preferably, a biasing means 61 for biasing the roller ring 40 into contact with the flange 11 and the fixed ring 30 can be provided. This can be done via a spring or an actuator. However, it is desirable for this biasing means 61 to be restricted or inactive, just to be released or activated when necessary in order to bias the roller ring 40 towards the flange 11. For example, a compressed spring can be released, or an actuator can be activated in order to bias the roller ring 40 and place the rollers 42 in contact with the flange 11.

The operation of the system for protection of a generator comprising a system 100 for decoupling of shafts will now be described in reference to FIGS. 1A to 1C, in order to help with the comprehension of the invention.

During the transmission of rotation during the normal operation of the gas turbine engine and of the generator, the two shafts 10, 20 are connected (axially) by meshing, as shown in FIG. 1A, and in rotation at a high speed.

The spring (not shown) on the shaft of the generator 10 (first shaft) axially biases the shaft of the generator 10 into connection with the shaft of the gas turbine engine 20 (second shaft). The roller ring 40 remains generally on the fixed ring 30, with each of its rollers 42 held downwards on the ramp 31 without touching the flange 11 of the first shaft 10. A monitoring system monitors the operation of the generator.

When a fault is detected in the generator, or in its gearbox, by the monitoring system of the generator, the decoupling system 100 is triggered. The roller ring 40 is, consequently, pushed in rotation between the flange 11 and the fixed ring 30 in order for these rollers 42 to move up the ramps 31 and come in contact with the flange 11. Preferably, the biasing means 61 is a compressed spring that is released in order to bias the roller ring 40 into rotation. Instead of a spring, an actuator or an electromagnet can also be used to place the roller ring 40 in contact with the flange 11.

At this stage, the rollers 42 touch the flange 11 and begin to rotate about their roller axis via the rotation imparted by the flange 11 of the generator shaft. The relative rotation between the flange 11 and the fixed ring 30 has the effect of making the rollers 42 roll along the circumferential ramps 31, in order to climb them, in the direction of rotation of the flange 11 and thus of the shaft of the generator 10.

FIG. 1B shows the rollers 42 of the roller ring 40 in the middle of the ramps 31, moving up them. When the rollers 42 begin to move up the ramps 31, they push between the flange 11 and the ramps 31 of the fixed ring. The roller ring 40 thus undergoes a rotation about the first axis, and a translation along the first axis when it is engaged by the flange 11. Consequently, the shaft of the generator 10 moves away, against the bias of the spring, from the shaft of the gas turbine engine 20. This has the effect that the teeth 13, 23 of the shafts of the generator and of the gas turbine engine that are dog clutching begin to separate axially. At this stage, the rotation is still transmitted between shafts 10, 20 since the teeth 13, 23 still meshed and are not completely separated.

FIG. 1C shows a position with the rollers 42 having reached the upper end of the ramps 31. In this position, the distance between the flange 11 and the fixed ring 30 is effectively at a maximum. It will be appreciated that the movement of the rollers 42 between their position on the ramps 31 in which they are in contact with the flange 11 for the first time, and their position at the top of the ramps 31, in the axial direction, correspond to a distance that is greater than the distance of engagement of the teeth 13, 23, thus allowing the decoupling of the shafts 10, 20. Thus, the teeth 13, 23 of the shafts 10, 20 are axially separated and the transmission of rotation is cut off, thus protecting the generator and its associated components.

This rapid decoupling by the protection system thus allows to protect the generator as soon as a fault is detected in the generator, and thus to prevent the generator from being driven when the fault exists, and the fault from being amplified and possibly destroys the generator. Moreover, this system 100 for decoupling of shafts is designed in such a way that it does not require a significant force to initiate the decoupling, and the decoupling of the shafts 10, 20 is carried out by mainly using the energy of rotation of the shafts 10, 20. Moreover, with two rollers 42 of the roller ring 40 pushing on the flange 10 at the diametrically opposed sides, a symmetrical force acts on the shaft of the generator 10 which is much better than an asymmetric force.

A trapping member 50 for maintaining the position of the roller ring 40 once the rollers 42 are at the top of the ramps 31 is ideally provided, in order for the shafts 10, 20 to remain decoupled. FIGS. 3A and 3B show, schematically, a roller 42 in its position at the bottom of the ramp 31, and the same roller 42 moved up and at the top of the ramp 31. This trapping member 50 is provided, in order to stop the rotation of the roller ring 40, with a stop 51 in order for the roller 42 (or the roller ring 40) to not go beyond a certain position nor fall onto the following ramp 31. Of course, this trapping member 50 can be part of the fixed structure 30.

Moreover, this trapping member 50 can be adapted in order to allow the rollers 42 to continue to rotate once the top position has been reached, for example, by raising the rollers 42 in order for them to no longer touch the ramps 31. In FIG. 3A, this trapping member is provided with two small wheels 52, spaced apart from one another along the ramp 31 and towards the top of the ramp 31, on and between which the roller 42 of the roller ring 40 can rest. This allows the rotation of the flange 11 of the generator shaft 10 during the stoppage of rotation caused by its inertia, but without the rollers 42 rubbing on the ramp 31, in order to prevent their rapid wear. In FIG. 3B, an inclined part 53 for raising the rod 41 of the roller ring 40 is provided, which thus raises the roller 42 from the ramp 31 and allows its rotation while the shaft of the generator 10 is still stopping rotation.

Figure 4:
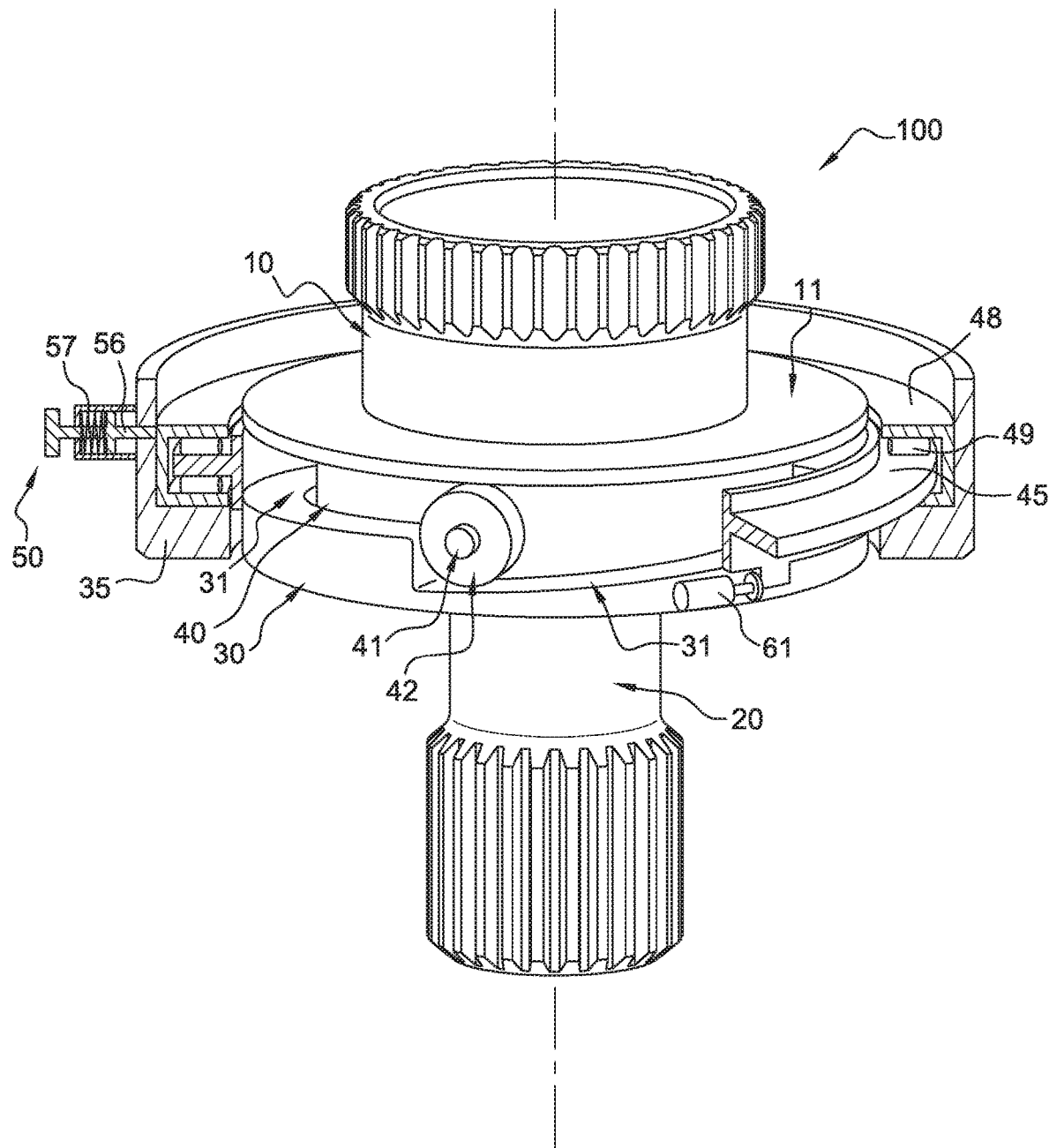
FIG. 4 illustrates, in a partial cross-sectional view, a variant of the system for decoupling of shafts.

In a variant shown in FIG. 4, the roller ring 40 is maintained movable in rotation at the top of the ramps 31. The roller ring 40 comprises an outer ring 45 connected to the rods 41 of the rollers 42 and which is supported movably in rotation by a roller support 48 with bearings 49, thus allowing the free rotation of the roller ring 40. For reasons of clarity and visibility, the outer ring 45 and the roller support 48 are not shown in their entirety.

The roller support 48 is mounted movably in translation, but not in rotation, in an annular frame 35, which can be part of the case of the generator, or a fixed structure. When the roller ring 40 rotates and moves up the ramps, the roller support 48 moves in translation in the same direction guided by the annular frame 35. Once the roller ring 40 is at the top of the ramps and the shafts are separated, a trapping member 50 is triggered and prevents it from moving back down. The trapping member 50 in this variant is a pin 56 biased by a spring 57, movable in order to engage with the bottom of the roller support 48.

In this way, the roller ring 40 can continue to rotate with the shaft of the generator 10 which is stopping rotation. This prevents its sudden stoppage, and thus this variant is more adapted to the rotation of the shafts at the very high speeds.

Once decoupled and the shaft of the generator 10 stopped, the generator can be repaired in order to correct the fault. The two shafts 10, 20 can then be again connected, by pulling the roller ring 40 in rotation in the opposite direction in order for each of its rollers 42 to move down to the bottom of the ramp 31, or for the variant, by releasing the pin 56 in order to allow the roller ring 40 to move back down, and by allowing the biasing spring to move the shaft of the generator 10 axially towards the shaft of the gas turbine engine 20. Preferably, a manual intervention is necessary to connect the two shafts 10, 20 and recreate the connection between the generator and the gas turbine engine. Advantageously, the shafts 10, 20 can be connected without removal of the generator.

Of course, instead of two rollers 42 and ramps 31 as described in the embodiment above, the decoupling system 100 can comprise even more rollers and ramps, for example three rollers and ramps. However, for a given circumference and axial separation, more ramps means that the rolling distance will be reduced while the incline of the ramp will be steeper, which can have the effect that the rollers slide with respect to the flange and the ramp, and remain at the bottom of the ramp instead of rolling up the ramp and pushing between the two.

It is also obvious that the system 100 for decoupling of shafts is not specific to the connections between generators and gas turbine engines. It is obvious that other uses for this system 100 for decoupling of shafts are possible. Moreover, it is not necessary for the second shaft 20 to be coaxial to the first axis. It can form an angle with respect to the first axis (and first shaft 10).

What is claimed is:

1. System (100) for rotational decoupling of shafts, comprising:
   a first shaft (10),
   a second shaft (20),
   the first shaft (10) extending along a first axis and being mounted rotatably about this axis, the first shaft (10) being capable of axially sliding along the first axis from a position of connection with transmission of rotation to the second shaft (20) to a position of decoupling from the second shaft (20), and vice versa,
   characterised in that the system (100) further comprises:
      a flange (11) located on the first shaft (10),
      a fixed structure (30) located substantially around the first axis and facing the flange (11), the fixed structure (30) comprising ramps (31) ascending in the axial direction towards the flange (11),
      a roller ring (40) located around the first axis and axially between the flange (11) and the fixed structure (30), the roller ring being movable in rotation and comprising rollers (42), the rollers being interposed between the ramps (31) and the flange (11),
   the roller ring (40) being configured to be rotated in such a way that the rollers (42) move, between the flange (11) and the ramps (31), in the direction of rotation of the flange (11) on the ramps (31) and in such a way as to axially move apart the flange (11) and the fixed structure (30), such that the first shaft (10) slides from a position of connection to the second shaft (20) to a decoupling position.

2. System according to claim 1, characterised in that the flange (11) extends radially from the first shaft with respect to the first axis, and the axes of rolling of rollers (42) are substantially perpendicular to the first axis.

3. System according to claim 1, characterised in that the fixed structure (30) is a fixed ring with two circumferential ramps (31) located on its diametrically opposed sides, and the roller ring (40) comprises two rollers (42) located on its diametrically opposed sides.

4. System according to claim 1, characterised in that it comprises a biasing means (61) for biasing the roller ring (40) into rotation.

5. System according to claim 4, characterised in that the biasing means (61) is a spring or an actuator.

6. System according to claim 1, characterised in that it comprises a trapping member (50) for maintaining the position of the roller ring (40) when these rollers (42) have moved to the top of the ramps.

7. System according to claim 6, characterised in that the trapping member (50) comprises a stop (51).

8. System according to claim 6, characterised in that the trapping member (50) comprises small wheels (52) or an inclined part (53).

9. System according to claim 6, characterised in that the roller ring (40) is rotatably mounted in a roller support (48), and in that the trapping member (50) comprises a pin (56) which is biased by a spring (57).

10. System according to claim 1, characterised in that the first shaft (10) is a driven shaft and the second shaft (20) is a drive shaft.

11. System for protection of a generator on a connection between a gas turbine engine and a generator, comprising:
   a monitoring system,
   a system (100) for rotational decoupling of shafts according to claim 1,
   wherein the first shaft (10) is a shaft of a generator and the second shaft (20) is a shaft linked to a gas turbine engine.

* * * * *